(12) United States Patent
Davenport et al.

(10) Patent No.: US 11,402,576 B2
(45) Date of Patent: Aug. 2, 2022

(54) PASSIVE COMPENSATION OF NON-UNIFORM CHANNEL CHARACTERISTICS OF SPECTRALLY SELECTIVE DEVICE ARRAYS IN MULTIWAVELENGTH PHOTONIC INTEGRATED CIRCUITS

(71) Applicant: Quintessent Inc., Goleta, CA (US)

(72) Inventors: Michael Davenport, Santa Barbara, CA (US); Brian Koch, Santa Barbara, CA (US)

(73) Assignee: Quintessent Inc., Goleta, CA (US)

( * ) Notice: Subject to any disclaimer, the term of this patent is extended or adjusted under 35 U.S.C. 154(b) by 0 days.

(21) Appl. No.: 17/233,036

(22) Filed: Apr. 16, 2021

(65) Prior Publication Data
US 2021/0325604 A1 Oct. 21, 2021

Related U.S. Application Data

(60) Provisional application No. 63/010,892, filed on Apr. 16, 2020.

(51) Int. Cl.
*G02B 6/12* (2006.01)

(52) U.S. Cl.
CPC ...... *G02B 6/12011* (2013.01); *G02B 6/12026* (2013.01); *G02B 2006/12121* (2013.01)

(58) Field of Classification Search
CPC ............ G02B 6/12011; G02B 6/12026; G02B 2006/12121
See application file for complete search history.

(56) References Cited

U.S. PATENT DOCUMENTS

| | | | |
|---|---|---|---|
| 6,275,317 B1 * | 8/2001 | Doerr | H04B 10/505 398/201 |
| 7,483,599 B2 | 1/2009 | Kish, Jr. et al. | |
| 9,031,412 B2 | 5/2015 | Nagarajan et al. | |
| 2003/0095737 A1 * | 5/2003 | Welch | G01R 31/31728 385/14 |

* cited by examiner

*Primary Examiner* — Ellen E Kim
(74) *Attorney, Agent, or Firm* — Kaplan Breyer Schwarz, LLP

(57) ABSTRACT

Aspects of the present disclosure are directed to wavelength division multiplexing systems comprising arrays of spectrally selective devices that are arranged on a substrate to compensate for perturbations of the spectral characteristics of the devices due to factors such as temperature non-uniformity, inherent spectral non-uniformity, and the like. As a result, shifts in the center wavelengths and/or changes in the wavelength spacing for the wavelength channels of a WDM system due to such perturbations are mitigated. In some embodiments, an array of spectrally selective devices is arranged on a substrate such that their respective wavelength channels are not linearly correlated with their physical position within the array, enabling the devices to be arranged in pairs that are subject to substantially the same environmental conditions and/or operate on nearly the same spectral range.

15 Claims, 6 Drawing Sheets

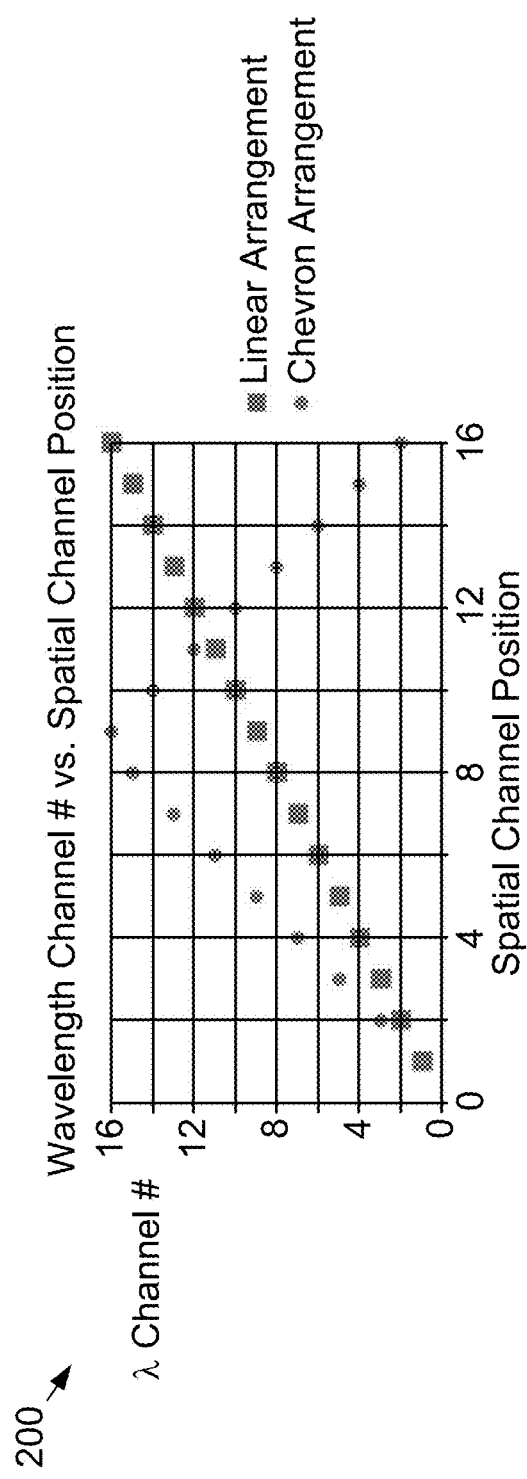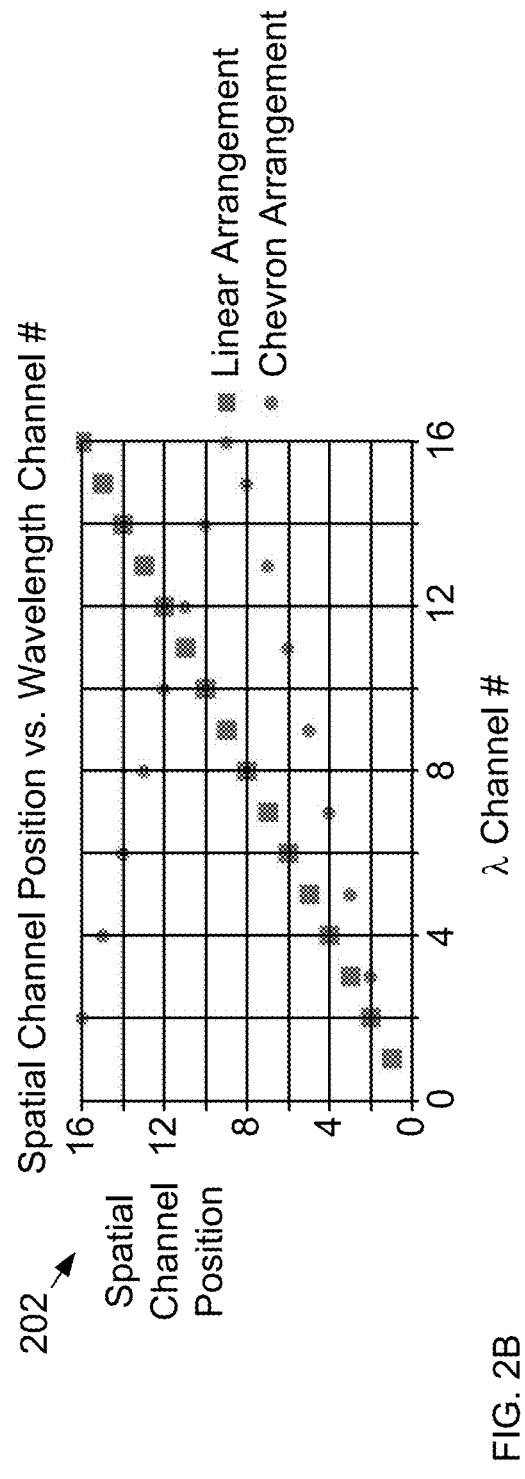
FIG. 2A
FIG. 2B

PASSIVE COMPENSATION OF NON-UNIFORM CHANNEL CHARACTERISTICS OF SPECTRALLY SELECTIVE DEVICE ARRAYS IN MULTIWAVELENGTH PHOTONIC INTEGRATED CIRCUITS

STATEMENT OF RELATED CASES

This case claims priority of U.S. Provisional Patent Application Ser. No. 63/010,892, filed Apr. 16, 2020, which is incorporated herein by reference.

If there are any contradictions or inconsistencies in language between this application and one or more of the cases that have been incorporated by reference that might affect the interpretation of the claims in this case, the claims in this case should be interpreted to be consistent with the language in this case.

TECHNICAL FIELD

The present disclosure relates to integrated-optics and photonic integrated circuits in general, and, more particularly, to the mitigation of non-uniform wavelength-channel characteristics across arrays of spectrally selective photonic devices included in photonic integrated circuits.

BACKGROUND

Wavelength Division Multiplexed (WDM) systems employ multiple wavelength channels, each having a center wavelength and a wavelength spacing that surrounds it. Such WDM systems have found widespread use in many applications, such as high-aggregate bandwidth optical communications systems and sub-systems, WDM-based networking, optical input/output for high-performance integrated circuits, and the like.

In recent years, photonic integrated circuits (PICs) comprising complete WDM systems and/or WDM sub-systems disposed on a single substrate have been developed, in part, to reduce the cost/complexity of such systems by eliminating packaging requirements, alignment issues during assembly and use, reduce overall system size, etc.

In a typical WDM PIC, arrays of wavelength-specific devices (e.g., lasers, optical filters, etc.) are arranged to define a WDM system. For example, the multiple operating wavelengths can be generated on-chip via an array of single-wavelength lasers, a comb laser that generates many simultaneous usable wavelengths from a single lasing medium, or a combination thereof. Once the wavelength signals have been generated, arrays of spectrally selective filters, such as ring-resonator-based filters having extremely narrow spectral bandwidths matched to a specific wavelength, can perform multiplexing/demultiplexing, etc. In some PICs, the wavelengths are generated off-chip and optically coupled into its waveguides, while multiplexing/demultiplexing, as well as other photonic functionality, etc., is performed on-chip.

In general, channel to channel uniformity and uniform channel spacing are critical to the performance of a WDM system. Furthermore, a desired frequency spacing—often with a minimum spacing specification—must be maintained between adjacent wavelength channels to avoid cross-talk between the light signals of adjacent channels, insertion loss, and the like.

Unfortunately, non-uniform perturbation of the spectral characteristics of an array of wavelength-dependent devices on a PIC can occur due to, for example, temperature non-uniformity across its substrate. In addition, some wavelength-dependent devices have inherent spectral non-uniformity, such as wavelength-dependent loss. These non-uniformities can give rise to system impairments and/or errors in the channel to channel uniformity, such as, for example:
  i. changes in the relative power levels of the wavelength channels; or
  ii. shifts in the center wavelengths; or
  iii. changes in the wavelength spacing for the wavelength channels; or
  iv. any combination of i, ii, and iii.

To mitigate degradation of system performance caused by such non-uniform device performance, prior-art PICs have required at least one of: active tuning of wavelength-dependent components, the use of complex optical-feedback loops, and/or optical-power taps for enabling real-time channel monitoring. However, active tuning elements are typically power-hungry, which can cause or exacerbate thermal issues, while optical-feedback loops and optical power taps increase optical loss in the system. In some cases, active tuning/control is avoided by employing coarse WDM (CWDM); however, a typical CWDM system has poor spectral efficiency, while also requiring optical elements throughout the system that have broader spectral bandwidth capabilities, which increases system cost and complexity.

A platform that enables passive compensation of nonuniform spectral characteristics of a multiwavelength photonic integrated circuit would be a significant advance in the state of the art.

SUMMARY

The present disclosure is directed toward passively compensating a non-uniformity of a spectral characteristic across an array of spectrally selective photonic devices, such as lasers, spectral filters, etc., that is disposed on a common substrate. Because compensation is realized passively, the need for additional overhead, circuitry, or power is reduced or eliminated. Embodiments in accordance with the present disclosure are particularly well suited for compensating spectral-behavior non-linearities associated with lasers whose wavelengths depend on a temperature-sensitive gain peak, lasers whose wavelengths depend on temperature-sensitive mirrors or other cavity elements (e.g., filters, resonators, etc.), modulators whose wavelengths depend on temperature-dependent absorption spectra or phase shifts, modulators whose wavelengths depend on temperature-dependent resonators, photodetectors whose wavelengths depend on temperature-dependent absorption spectra or phase shifts, photodetectors whose wavelengths depend on temperature-dependent resonators, passive elements whose wavelengths depend on temperature-dependent absorptions or phase shifts, passive elements whose wavelengths depend on temperature-dependent resonators or, more generally, any temperature-dependent index of refraction, and the like.

An advance is made over the prior art by forming a linear array of spectrally selective devices, each selective for a different wavelength channel within a set of spectrally adjacent wavelength channels, where devices are arranged within the array such that their respective wavelength channels are not linearly correlated with their physical position within the array. In other words, the wavelength channels on which the devices in the array operate are not sequentially ordered along the spatial positions of the array. Instead, the devices are arranged in an order that is based on a non-uniform distribution of a spectral characteristic and/or environmental condition. In some embodiments, an array of devices is arranged such that pairs of adjacent devices within the array are subject to substantially the same environmental conditions and/or operates on nearly the same spectral range.

An illustrative embodiment in accordance with the present disclosure is a photonic integrated circuit comprising a 1×16 array of sixteen distributed feedback (DFB) lasers designed to be centered at a different wavelength channel of a set of sixteen adjacent wavelength channels, $\lambda 1$ through $\lambda 16$. The lasers are arranged along a linear arrangement of spatial positions, denoted as sequential spatial positions 1 through 16.

During operation of the laser array, heat generated by each laser gives rise to a temperature increase having a parabolic profile arises across the laser array such that the pair of lasers located at the center spatial positions in the array experience the greatest temperature increase while the lasers located at the outermost spatial positions in the array experience the smallest temperature increase. In other words, the outermost lasers of the array (i.e., the lasers in spatial positions 1 and 16), are at substantially the same lowest temperature, the lasers located one spatial position in from each end of the array (i.e., the lasers in spatial positions 2 and 15), are at substantially the same slightly higher temperature, and so on, resulting in the lasers located at the two center-most spatial positions (i.e., the lasers in spatial positions 8 and 9), being at substantially the same highest temperature.

To passively compensate for the effects of this parabolic temperature increase, the lasers of the array are arranged so that spectrally adjacent wavelength channels are generated by lasers that are located at spatial positions having substantially the same temperature during operation of the laser array. As a result, the lasers that generate wavelength channels $\lambda 1$ and $\lambda 2$ are located at the two outermost spatial positions (i.e., spatial positions 1 and 16), the lasers that generate wavelength channels $\lambda 3$ and $\lambda 4$ are located at the spatial positions that are one position in from either end (i.e., spatial positions 2 and 15), and so on, with the central-most lasers (i.e., the lasers in spatial positions 8 and 9) generating wavelength channels $\lambda 15$ and $\lambda 16$. By virtue of this arrangement, the induced error of the channel spacings between adjacent channels is effectively cut in half as compared to the error induced in a laser array that generates wavelength channels that are arranged linearly according to spatial position.

In some embodiments, an array of spectrally selective devices is arranged to passively compensate for a temperature profile across the array that has a profile other than parabolic, such as Gaussian, and the like. In some embodiments, an array of spectrally selective devices is arranged to passively compensate for a spectral non-uniformity that is due to a parameter other than temperature.

As a consequence of the reduction in induced channel-spacing error, the amount of tuning necessary to align a downstream wavelength filter, or other wavelength-selective device, with its respective wavelength channel is dramatically reduced. Since such wavelength filters are typically based on thermal tuning, this significantly reduced the total power dissipation of a PIC in accordance with the present disclosure.

In some embodiments, a PIC includes waveguide crossings that optically couple the output of an array of wavelength-selective devices with a fixed spectral configuration element, such as an arrayed waveguide grating (AWG).

In some embodiments, the waveguide channels of an array of wavelength-selective devices are spatially distributed such that induced error is inversely proportional to the spectral separation from the center of the total spectral range of the wavelength channels. In other words, the induced errors are smallest for the shortest and longest wavelength channels and largest for the central wavelength channels. Such embodiments mitigate non-uniformity of spectral behavior of a WDM system as a whole, since the performance of a typical WDM system degrades as the wavelength of operation deviates from the center wavelength of its total spectral bandwidth. Such embodiments can be particularly useful for WDM systems that require minimal wavelength error relative to a fixed wavelength grid (e.g., the ITU grid), and for which it is advantageous to incur the largest wavelength deviation near the center of total spectral bandwidth of the WDM system.

An embodiment in accordance with the present disclosure is a photonic integrated circuit (PIC) including a wavelength-division multiplexed (WDM) system disposed on a substrate, wherein the PIC includes: a plurality of devices that are wavelength selective, the plurality of devices being disposed on the substrate in a first arrangement along a first dimension, wherein each device of the plurality thereof has an operating wavelength that is within a different wavelength channel of a plurality of wavelength channels that are spectrally sequential within a spectral range; wherein the plurality of wavelength channels having center wavelengths that increase linearly within the spectral range; and wherein the plurality of devices is arranged in the first arrangement such that the operating wavelengths change non-linearly along the first dimension.

Another embodiment in accordance with the present disclosure is a photonic integrated circuit (PIC) including a wavelength-division multiplexed (WDM) system, wherein the PIC includes: a substrate that includes N spatial positions SP-i, where i=1 through N, wherein the spatial positions are arranged such that the value of i increases linearly along a first dimension; and a plurality of devices DEV-$\lambda$i, where i=1 through N, disposed on the substrate in spatial positions SP-1 through SP-N, wherein devices DEV-$\lambda 1$ through DEV-$\lambda$N are wavelength selective for wavelength channels $\lambda 1$ through $\lambda$N, respectively, and wherein the plurality of devices is arranged in a first arrangement in which at least one device DEV-$\lambda$i is located at a spatial position other than spatial position SP-i; wherein a performance characteristic of each of devices DEV-$\lambda 1$ through DEV-$\lambda$N is based on a parameter that is non-uniform along the first dimension, the parameter being selected from the group consisting of temperature, wavelength-dependent loss, signal integrity, and signal strength.

Yet another embodiment in accordance with the present disclosure is a method for passively compensating for a parameter that is non-uniform along a first dimension of a photonic integrated circuit (PIC) that includes a wavelength-division multiplexed (WDM) system, the method including: providing a substrate that includes N spatial positions SP-i, where i=1 through N, wherein the spatial positions are arranged such that the value of i increases linearly along the first dimension; and providing a plurality of devices DEV-$\lambda$i, where i=1 through N, disposed on the substrate in spatial positions SP-1 through SP-N, wherein devices DEV-$\lambda 1$ through DEV-$\lambda$N are wavelength selective for wavelength channels $\lambda 1$ through $\lambda$N, respectively, and wherein a performance characteristic of each of devices DEV-1 through DEV-N is based on the parameter; wherein the plurality of devices is arranged in a first arrangement in which at least one device DEV-$\lambda$i is located at a spatial position other than spatial position SP-i; and wherein the parameter being selected from the group consisting of temperature, wavelength-dependent loss, signal integrity, and signal strength.

BRIEF DESCRIPTION OF THE DRAWINGS

FIG. 2A depicts a plot of wavelength channel versus spatial position for device array 102.

FIG. 2B depicts a plot of spatial position versus wavelength channel for device array 102.

DETAILED DESCRIPTION

Figure 1:
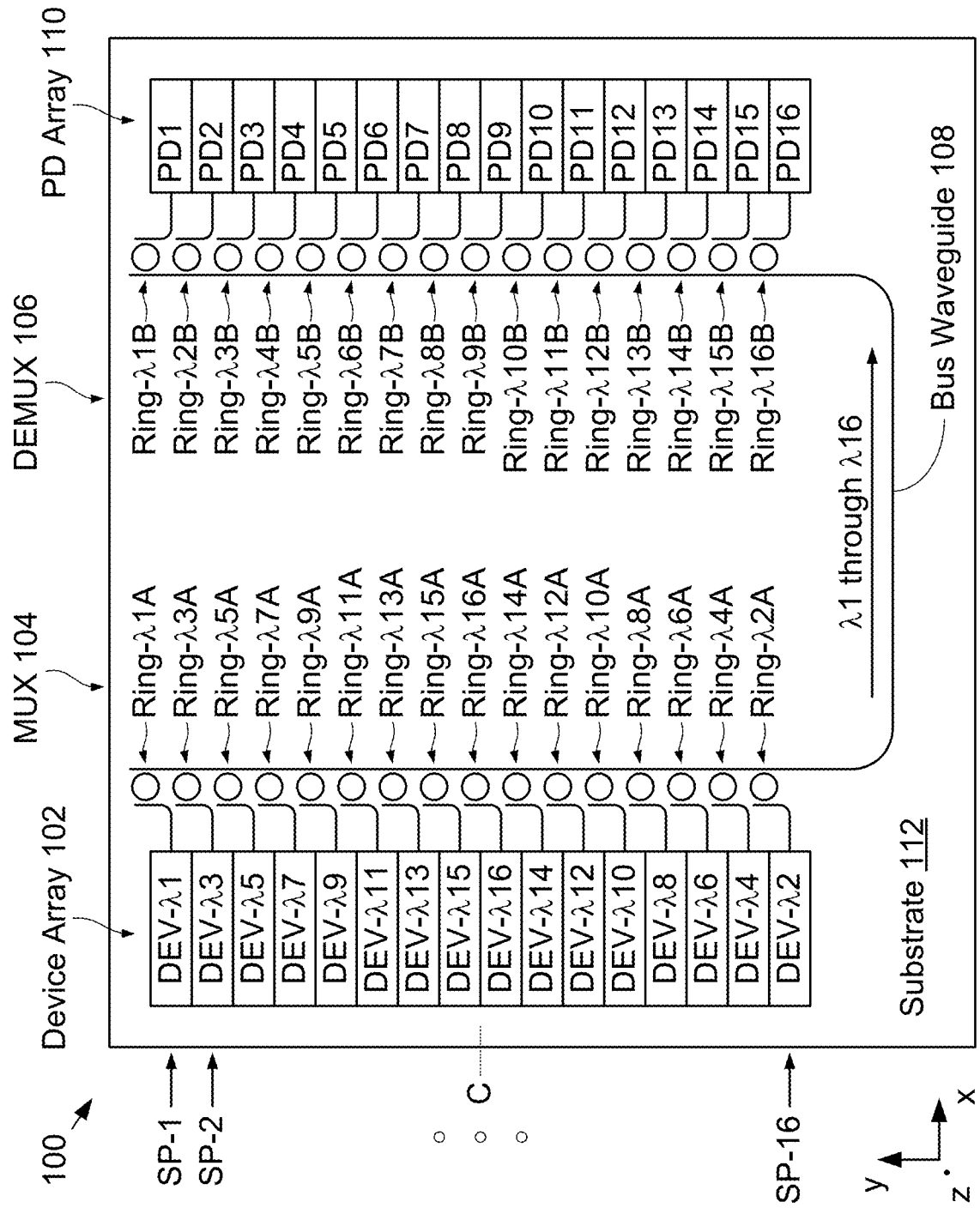
FIG. 1 depicts a schematic drawing of an illustrative embodiment of a PIC that contains a WDM system having passively compensated thermally-induced spectral-behavior non-uniformity in accordance with the present disclosure.

FIG. 1 depicts a schematic drawing of an illustrative embodiment of a PIC that contains a WDM system having passively compensated thermally-induced spectral-behavior non-uniformity in accordance with the present disclosure. System 100 includes device array 102, multiplexer 104, demultiplexer 106, bus waveguide 108, and photodetector array 110, and all which are monolithically integrated on substrate 112.

In the depicted example, system 100 is a dense wavelength-division multiplexed (DWDM) system; however, it should be noted that the teachings herein can be applied to any type of WDM system (e.g., coarse WDM (CWDM), etc.) without departing from the scope of the present disclosure.

In the depicted example, substrate 112 is a conventional silicon substrate; however, any suitable substrate can be used without departing from the scope of the present disclosure. Suitable substrates include, without limitation, semiconductor substrates, ceramic substrates, organic substrates, composite-material substrates, chip carriers, and the like.

Device array 102 includes devices DEV_$\lambda 1$ through DEV_$\lambda 16$, which are linearly arranged along the y-dimension (as shown) to form a 1×16 array having spatial positions SP-1 through SP-16. Devices DEV_$\lambda 1$ through DEV_$\lambda 16$ are DFB lasers designed to emit light that is centered within each of wavelength channels $\lambda 1$ through $\lambda 16$, respectively.

Typically, a WDM system requires a minimum/maximum wavelength spacing between adjacent channels and a maximum wavelength/frequency error between the wavelength filters of down-stream MUX 104 and DEMUX 106. In some cases, each of devices DEV_$\lambda 1$ through DEV_$\lambda 16$ must be tuned to maintain an approximate WDM grid and/or the downstream components must be tuned to the lasing wavelength to satisfy the system requirements for minimum/maximum wavelength spacing between adjacent channels and a maximum wavelength/frequency error, as well as compensate for temperature induced channel non-uniformities.

Multiplexer (MUX) 104 includes ring-resonator-based wavelength filters Ring_$\lambda 1$A through Ring_$\lambda 16$A, which are optically coupled with devices DEV_$\lambda 1$ through DEV_$\lambda 16$, respectively. In the depicted example, each of the wavelength filters of MUX 104 and the lasers of device array 102 is designed for operation on substantially the same wavelength channel; however, each of the wavelength filters has a finite frequency/wavelength bandwidth surrounding its respective wavelength channel. As a result, each of wavelength filters Ring_$\lambda 1$A through Ring_$\lambda 16$A is tunable so that its passband can be matched to the wavelength channel of its corresponding laser.

Tunability of a wavelength filter is normally enabled by controlling the current flow through a heater (not shown) that is thermally coupled to the ring; however, the amount of tuning provided is preferably small to limit the amount of power dissipated by the heater. Furthermore, the temperature required to induce large amounts of tuning can result in thermal damage of the wavelength filter itself. As a result, in some embodiments, each of the wavelength filters of MUX 104 is designed so that its untuned wavelength of operation is matched, or nearly matched, to the wavelength channel of its corresponding laser in device array 102. As a result, in such embodiments, the wavelength filters of mux 104 are arranged along the y-dimension in similar fashion as the lasers of device array 102.

In some embodiments, different sets of WDM elements are arranged to enable compensation of different non-linearities along a particular dimension or to realize improved compensation of the same non-linearity. For example, in some embodiments, the elements of device array 102 and demux 106 are arranged in different orders along the y-dimension so that the device array compensates for a first non-linearity (e.g., non-uniform temperature) while the demux compensates for a second, different non-linearity (e.g., limited spectral bandwidth of system 100 as a whole).

DEMUX 106 includes ring-resonator-based wavelength filters Ring_$\lambda 1$B through Ring_$\lambda 16$B. Wavelength filters Ring_$\lambda 1$B through Ring_$\lambda 16$B are analogous to wavelength filters Ring_$\lambda 1$A through Ring_$\lambda 16$A such that the two sets of wavelength filters are substantially matching.

Mux 104 and DEMUX 106 are optically coupled via bus waveguide 108.

Photodetector (PD) array 110 includes photodetectors PD1 through PD16, each of which is a conventional photodetector capable of detecting any of wavelength channels $\lambda 1$ through $\lambda 16$.

The wavelength filters of Mux 104 and DEMUX 106, bus waveguide 108, and the waveguides that optically couple each of the wavelength filters with its respective laser or photodetector are conventional integrated-optics-based surface waveguides formed on substrate 112 to collectively define at least a portion of planar lightwave circuit (PLC) 114. It should be noted that any suitable surface-waveguide technology, or combinations of different waveguide technologies, can be used in PLC 114 without departing from the scope of the present disclosure. Surface-waveguide technologies suitable for use in accordance with the present disclosure include, without limitation, silica waveguides, silicon-oxide-based waveguides, silicon nitride waveguides, silicon waveguides, compound semiconductor waveguides, and the like.

It should be noted that the physical arrangement of the wavelength filters of DEMUX 106 can be any suitable arrangement since the wavelength channels are multiplexed when they arrive at the DEMUX and photodetectors PD1 through PD16 are not wavelength selective within the total spectral bandwidth of system 100.

In some embodiments, mux 104 and demux 106 are located on different substrates and are optically coupled via an optical fiber. As a result, bus waveguide 108 is not included. In some embodiments, mux 104 and demux 106 are located the same substrate but bus waveguide 108 is replaced by an optical fiber. In some embodiments, an optical fiber is used to provide optically coupling between at least one of: device array 102 and mux 104, mux 104 and demux 106, and demux 106 and PD array 110.

In some embodiments, system 100 is formed as a multi-chip module in which at least two of device array 102, mux 104, demux 106, and PD array 110 are located on separate chips that are mounted to a common carrier or substrate. In some embodiments, substrate 112 includes one or more electronic components and/or electrical connections.

When device array 102 generates wavelength channels $\lambda 1$ through $\lambda 16$, each laser dissipates power and generates heat, which increases the local temperature of the device. Neighboring devices will experience thermal cross-talk from the device in operation, the degree of which depends on the physical proximity of the devices, the thermal conductivity of the substrate, heat sinking, and other relevant effects. Because device array 102 is integrated on the same substrate (i.e., substrate 112), the combination of self-heating and thermal cross-talk causes the optical properties of each device—such as wavelength—to drift from the intended design value due to thermo-optic effects. In addition, this non-uniform temperature profile can affect other properties of photonic devices, such as bandgap and lasing wavelength, as well as the refractive index of most semiconductor materials via the thermo-optic effect.

Furthermore, because the lasers near the center of device array 102 are less able to dissipate heat generated by laser operation, their temperature increases more than the laser near the outer edges of the array, thereby giving rise to a non-uniform temperature distribution across the array of lasers. Commonly, this non-uniform distribution approximates a parabolic temperature profile, with the maximum temperature being at the center, C, of device array 102.

It should be noted that, although the illustrative embodiment is a PIC comprising a WDM system that includes arrays of spectrally selective devices for generating and operating on different wavelengths, the teachings of the present disclosure can also be directed toward systems having one or more arrays of devices that generate/operate on the same wavelength.

In some embodiments, a PIC includes a laser array whose elements all emit light having the same wavelength. The emitted light signals are then provided to a WDM sub-system on the PIC that performs photonic functions (multiplexing, demultiplexing, filtering, etc.) on these light signals as well as other light signals having different wavelengths that are already existent in the WDM sub-system. In accordance with the teachings of the present disclosure, the elements of the monochromatic laser array could be arranged based on a system-level parameter of the WDM sub-system (e.g., non-uniform propagation-loss characteristics, etc.) such that light signals to be coupled into higher loss waveguide circuits have a wavelength that is, for example, closer to the design wavelength of the laser array.

In some other embodiments, an arrangement of monochromatic lasers might be based on a non-uniform environmental condition (e.g., non-uniform temperature profile across the array, etc.) to compensate for the effects of a system-level non-uniformity (e.g., a known non-uniformity across the set of drive signals provided to the array due to, for example, different path lengths giving rise to different power drops, etc.). By arranging the devices such that those having the longest drive-signal paths see the lowest temperature, the environmental non-uniformity and the system-level non-uniformity are at least partially offset.

In the prior art, the deleterious effects arising from a non-uniform thermal environment are mitigated by methods that include the use of active tuning and/or feedback loops, such as those disclosed by Nagarajan, et al., in U.S. Pat. No. 9,031,412 and Kish, et al., in U.S. Pat. No. 7,483,599, each of which is incorporated herein by reference.

In some prior-art methods, wavelength-sensitive devices are designed a priori to inherently compensate for an anticipated temperature non-uniformity. For example, designing the lasers of a DFB laser array can be designed such that the wavelengths of their gratings are shifted by an amount based on anticipated temperature differences between the devices. Unfortunately, if the temperature profile is not as anticipated or is not known precisely, such an approach could not only still lead to errors, but might actually exacerbate the problem.

Yet another prior-art approach for mitigating the effects of temperature non-uniformity requires highly efficient heat sinking of the wavelength-sensitive devices to realize only a very small temperature variation across the array. Unfortunately, such approaches are typically quite expensive. In addition, they can limit the environment in which a WDM system can be used, such as excluding the possibility of mounting a PIC directly on a printed circuit board that includes driver electronics.

It is an aspect of the present disclosure that temperature-induced errors in channel spacing due to non-uniform temperature distribution across device array 102 can be passively mitigated by arranging the lasers of the device array such that adjacent wavelength channels are generated by lasers that are at substantially the same operating temperature. Because methods in accordance with the present disclosure are passive, no additional overhead, circuitry or power, is required.

In the depicted example, the lasers of device array 102, as well as their corresponding ring-based wavelength filters in mux 104, are arranged to passively compensate for a non-uniform temperature distribution along the y-dimension. such that devices DEV_$\lambda 1$ and DEV_$\lambda 2$ are located at spatial positions SP-1 and SP-16, devices DEV_$\lambda 3$ and DEV_$\lambda 4$ are located at spatial positions SP-2 and SP-15, devices DEV_$\lambda 5$ and DEV_$\lambda 6$ are located at spatial positions SP-3 and SP-14, devices DEV_$\lambda 7$ and DEV_$\lambda 8$ are located at spatial positions SP-4 and SP-13, devices DEV_$\lambda 9$ and DEV_$\lambda 10$ are located at spatial positions SP-5 and SP-12, devices DEV_$\lambda 11$ and DEV_$\lambda 12$ are located at spatial positions SP-6 and SP-11, devices DEV_$\lambda 13$ and DEV_$\lambda 14$ are located at spatial positions SP-7 and SP-10, and devices DEV_$\lambda 15$ and DEV_$\lambda 16$ are located at spatial positions SP-8 and SP-9.

FIG. 2A depicts a plot of wavelength channel versus spatial position for device array 102.

FIG. 2B depicts a plot of spatial position versus wavelength channel for device array 102.

As can be seen in each of plots 200 and 202, the pattern of wavelength channels as plotted against spatial channel position resembles that of a chevron; therefore, the laser arrangement of device array 102 is referred to as a "chevron" arrangement.

Figure 3A:
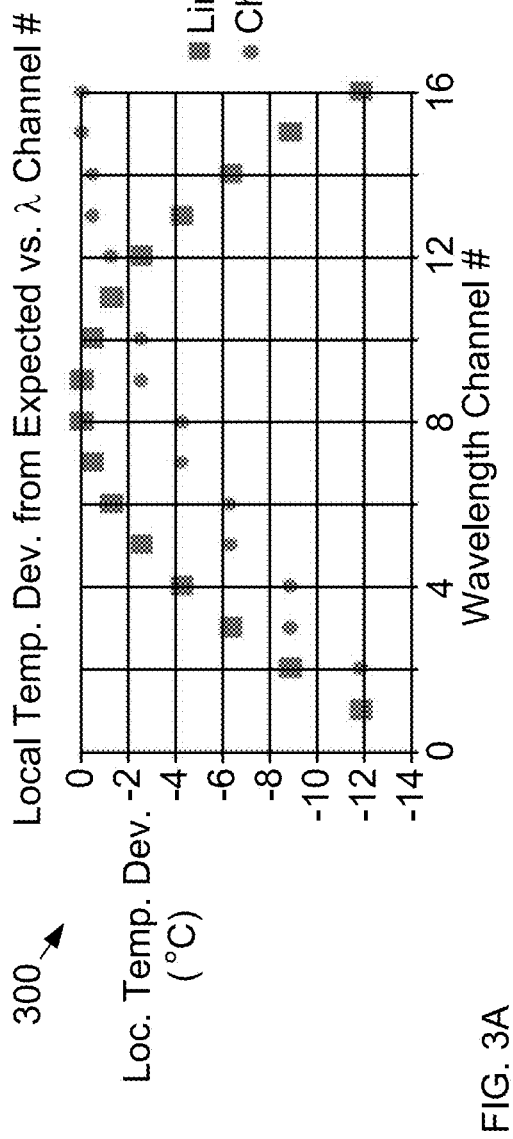
FIG. 3A depicts a plot of the relative temperature distribution for each of a linear arrangement and a chevron arrangement of the lasers of a laser array as a function of wavelength channel.

FIG. 3A depicts a plot of the relative temperature distribution for each of a linear arrangement and a chevron arrangement of the lasers of a laser array as a function of wavelength channel. Plot 300 shows that the lasers of a linearly arranged laser array experience a symmetrical, substantially parabolic temperature deviation for the wavelength channels, where the parabolic distribution is centered on the central wavelength channels (i.e., $\lambda 8$ and $\lambda 9$). In comparison, adjacent-wavelength-channel pairs of a chevron arrangement experience a substantially linear decrease in temperature from a peak at the longest wavelength channels (i.e., $\lambda 15$ and $\lambda 16$) to a minimum at the shortest wavelength channels (i.e., $\lambda 1$ and $\lambda 2$).

Figure 3B:
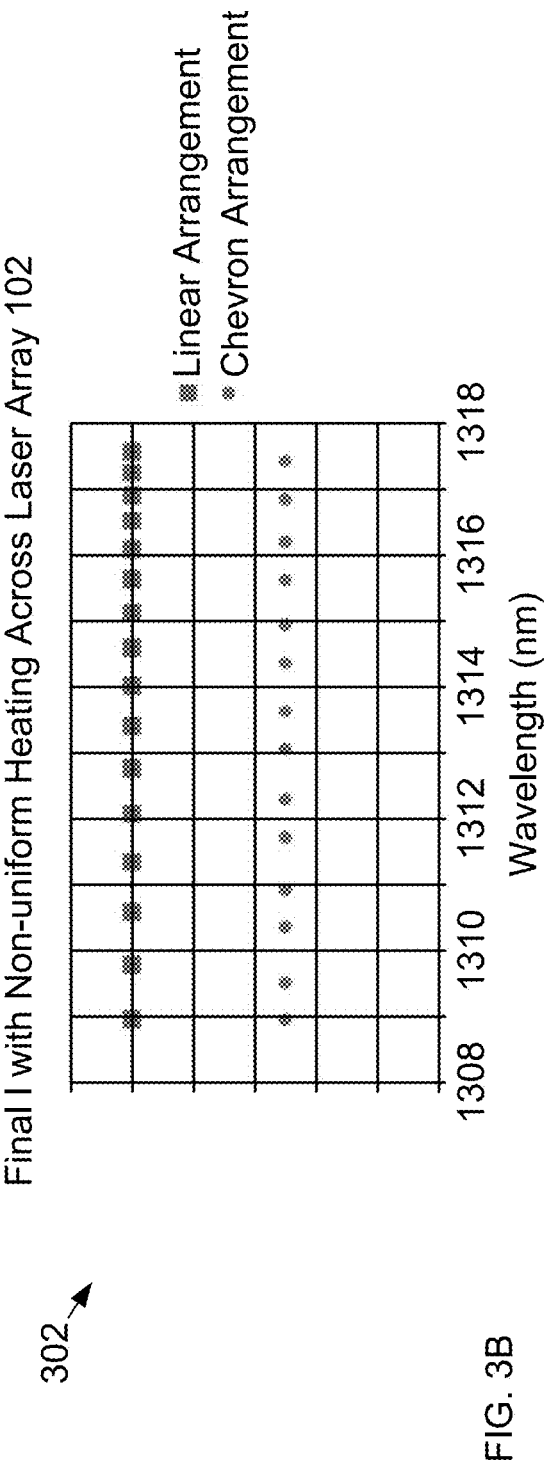
FIG. 3B depicts a plot of the actual wavelengths for wavelength channels $\lambda 1$ through $\lambda 16$ for a linearly arranged laser array and a chevron arrangement of laser in accordance with the present disclosure.

FIG. 3B depicts a plot of the actual wavelengths for wavelength channels $\lambda 1$ through $\lambda 16$ for a linearly arranged laser array and a chevron arrangement of laser in accordance with the present disclosure.

Plot 302 shows that the channel spacing between the wavelength channels of the linearly arranged laser array steadily decreases from wavelength channels $\lambda 1$ to $\lambda 16$, with the channel spacing between wavelength channels $\lambda 15$ and $\lambda 16$ being inordinately small.

In contrast, while they alternate between relatively narrower and wider channel spacings, the channel spacings for the chevron arrangement of lasers remains substantially large across the entire spectral width of system 100. Furthermore, the relatively narrower channel spacing are exactly on their design target, while the relatively wider channel spacings advantageously afford a more relaxed frequency spacing than targeted.

Figure 4A:
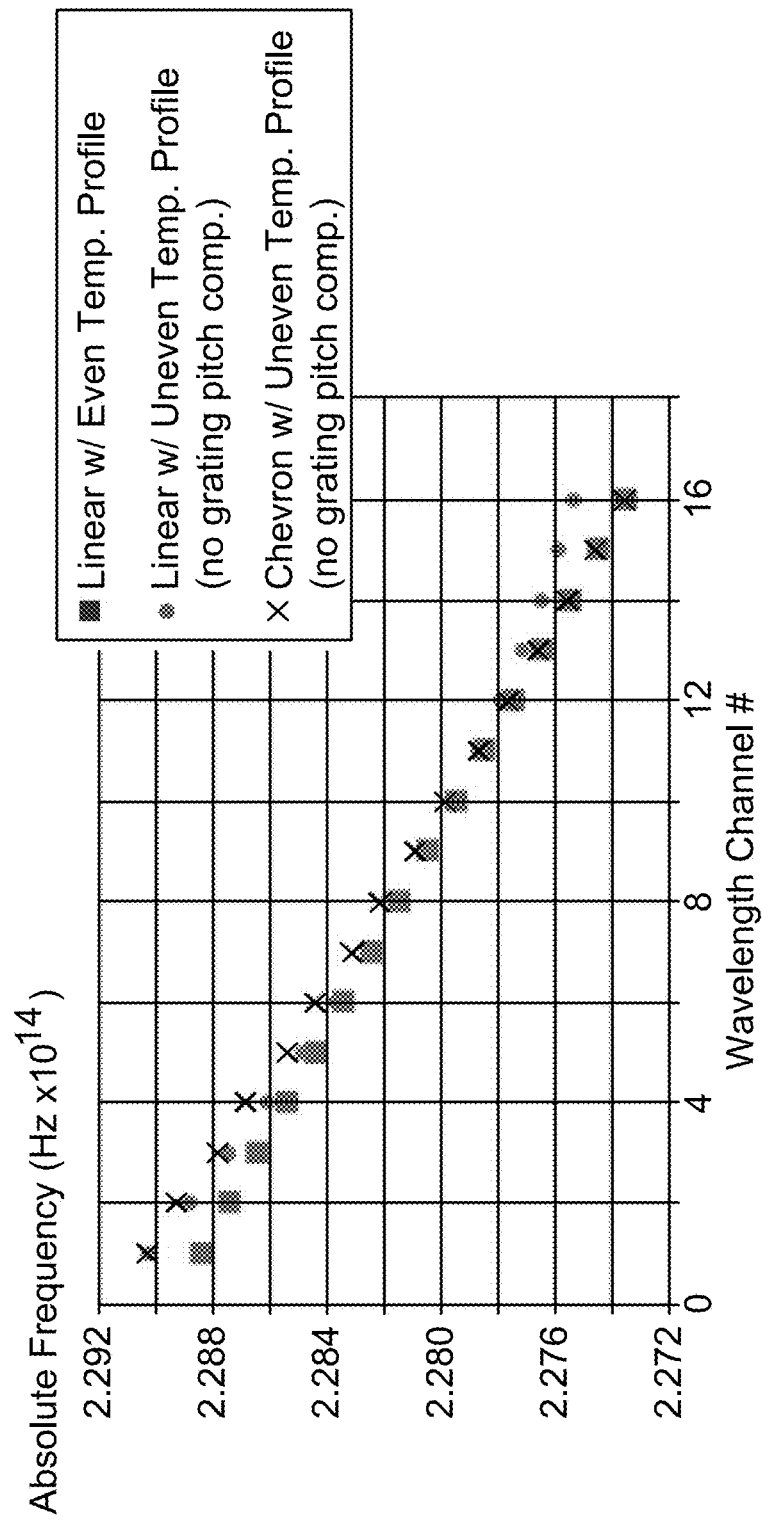
FIGS. 4A-B depict plots of absolute frequency and frequency-spacing error, respectively, for linear and chevron-arranged laser arrays, with and without a non-uniform temperature profile.
Figure 4B:
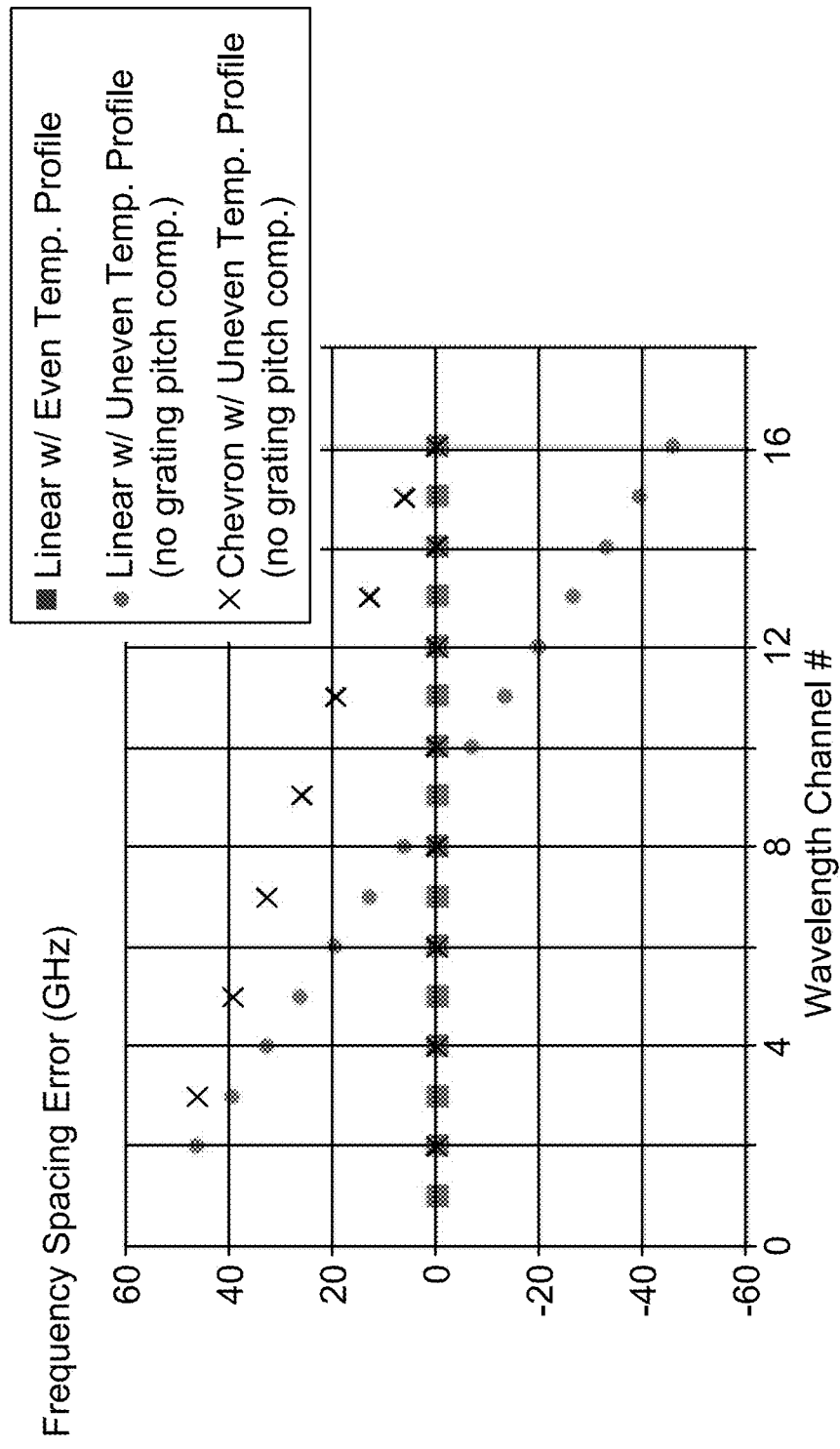

FIGS. 4A-B depict plots of absolute frequency and frequency-spacing error, respectively, for linear and chevron-arranged laser arrays, with and without a non-uniform temperature profile. The simulation results provided in plots 400 and 402 are for a laser array designed to account for the largest temperature deviation occurring for the longest wavelength channels.

It can be seen from plot 400 that the frequency deviation from design frequencies occurs only for the shorter half of wavelength channels and has substantially the same magnitude as the frequency deviation of the linearly arranged laser array.

From plot 402, therefore, it can readily be seen that the chevron arrangement reduces the frequency-spacing error of a laser array by roughly a factor of 2.

Figure 5:
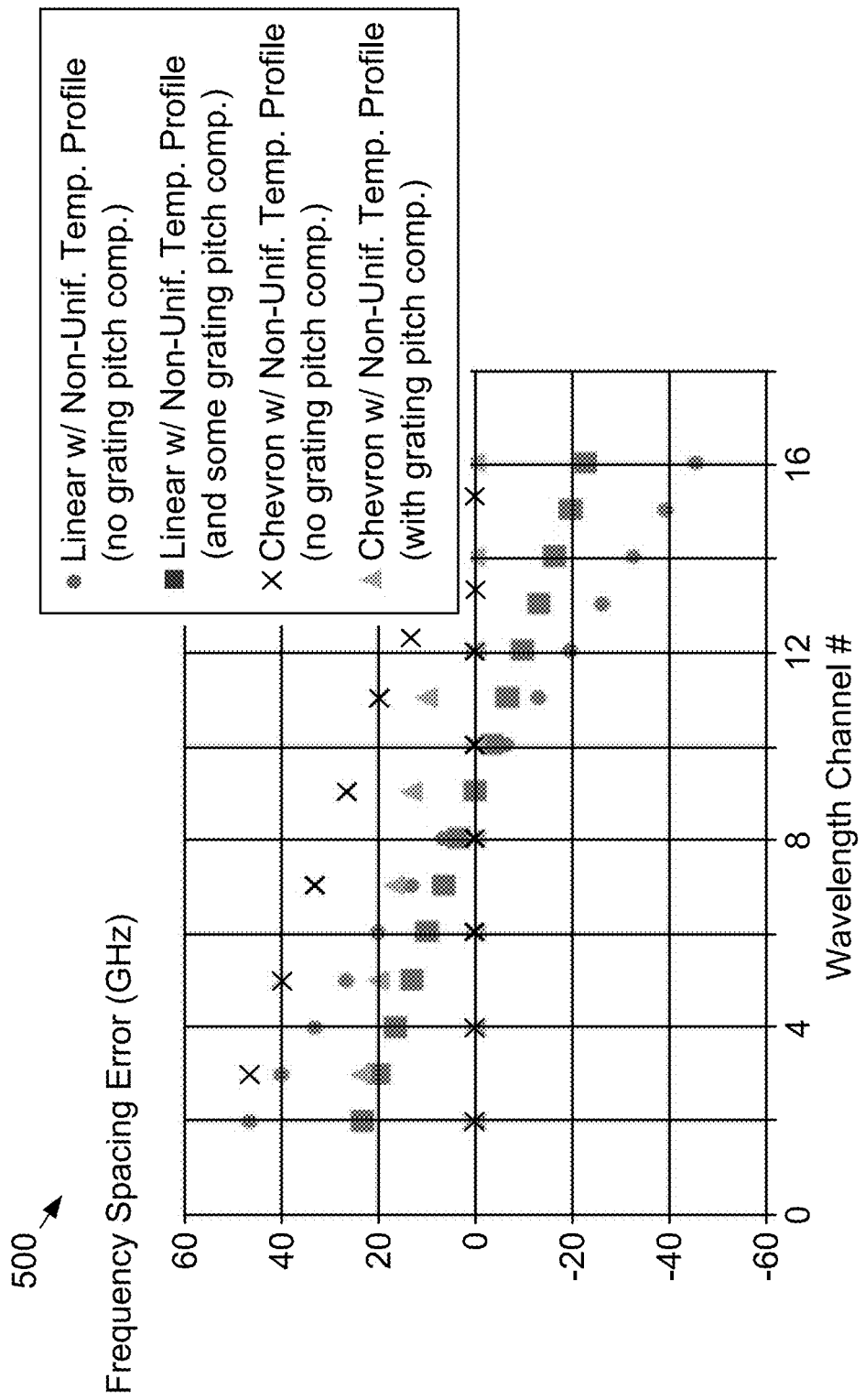
FIG. 5 depicts a plot of frequency-spacing error for arrays of DFB lasers having a linear arrangement, a linear arrangement including grating compensation, a chevron arrangement, and a chevron arrangement that includes grating compensation, each in the presence of a non-uniform temperature profile.

FIG. 5 depicts a plot of frequency-spacing error for arrays of DFB lasers having a linear arrangement, a linear arrangement including grating compensation, a chevron arrangement, and a chevron arrangement that includes grating compensation, each in the presence of a non-uniform temperature profile.

Plot 500 shows that frequency spacing can be kept at nearly the design value when an array of DFB lasers is arranged in a chevron arrangement and the lasers include gratings whose pitches are altered to compensate for the anticipated temperature deviation at their respective spatial positions.

Furthermore, the inclusion of grating compensation in a chevron arrangement of DFB lasers realizes an approximately 50% reduction in frequency-spacing error as compared to a grating-compressed linearly arranged DFB laser array.

It should be noted that, in addition to controlling the wavelengths of wavelength-selective devices in a WDM array, methods in accordance with the present disclosure can be used to control other characteristics of such devices, such as optical gain.

Other potential advantages afforded by the teachings of the present disclosure include:
i. increased device yield—particularly for multi-wavelength laser arrays; or
ii. increased system yield for WDM PICs; or
iii. reduced overall circuit power consumption; or
iv. reduced requirements for thermal isolation between elements of a wavelength-selective device array; or
v. reduced thermal crosstalk; or
vi. improved device performance; or
vii. operation with different channel spacings based on the minimum required to avoid crosstalk between each pair of adjacent wavelength channels, thereby enabling a reduction in total WDM spectral bandwidth or an increased number of wavelength channels; or
viii. optimizing device performance on a device-by-device basis; or
ix. optimizing device performance for only specific devices within a WDM device array (e.g., wavelength targeting, optical-gain targeting, optimizing threshold current, etc.); or
x. any combination of i, ii, iii, iv, v, vi, vii, viii, and ix.

In some embodiments, the wavelength channels are arranged among an array of wavelength-selective devices such that devices associated with the middle wavelengths of the WDM grid have the minimum channel spacing and outer wavelengths have the largest channel spacing. This can be particularly useful in systems where crosstalk increases with smaller channel spacing, and the effective impairment from such crosstalk is minimized in the edge channels of the WDM grid so as to offset the higher link loss at those edge wavelengths.

In some embodiments, the lasers of device array 102 are designed to incorporate a wavelength correction based on an anticipated temperature profile, as discussed above. It should be noted that, for embodiments in accordance with the present disclosure, the use of such a technique requires less of a pre-determined wavelength shift and, therefore, any error in the designed shift would be smaller than that of prior-art systems.

It is to be understood that the disclosure teaches only examples of embodiment in accordance with the present disclosures and that many variations of these embodiments can easily be devised by those skilled in the art after reading this disclosure and that the scope of the present invention is to be determined by the following claims.

What is claimed is:

1. A photonic integrated circuit (PIC) including a wavelength-division multiplexed (WDM) system disposed on a substrate, wherein the PIC includes:
a plurality of devices that are wavelength selective, the plurality of devices being disposed on the substrate in a first arrangement along a first dimension, wherein each device of the plurality thereof has an operating wavelength that is within a different wavelength channel of a plurality of wavelength channels that are spectrally sequential within a spectral range;
wherein the plurality of wavelength channels having center wavelengths that increase linearly within the spectral range; and wherein the plurality of devices is arranged in the first arrangement such that the operating wavelengths change non-linearly along the first dimension.

2. The PIC of claim 1 wherein the first arrangement is based on a parameter that is non-uniform along the first dimension, and wherein a performance characteristic of each device of the plurality thereof is based on the parameter at its location along the first dimension.

3. The PIC of claim 2 wherein the parameter is selected from the group consisting of temperature, wavelength-dependent loss, signal integrity, and signal strength.

4. The PIC of claim 2 wherein a plurality of spatial positions on the substrate is sequentially distributed along the first dimension from spatial position SP-1 to spatial position SP-N, and wherein the plurality of operating wavelengths includes wavelengths $\lambda 1$ through $\lambda N$, and further wherein a first performance characteristic of a first device DEV-$\lambda i$ of the plurality of devices, where i is within the range from 1 to N, has a first value based on the parameter at its location in the first arrangement and a second value based on the parameter at spatial position SP-i, the first and second values being different.

5. The PIC of claim 2 wherein each device of the plurality thereof comprises a laser for emitting an output signal having a design frequency that corresponds to the center wavelength of a different wavelength channel of the plurality thereof, and wherein each pair of adjacent design frequencies is separated by a frequency spacing, and wherein the non-uniform parameter causes a first error of a first frequency spacing of the plurality thereof, and further wherein the first arrangement reduces the first error.

6. The PIC of claim 1 wherein each device of the plurality thereof is selected from the group consisting of a laser, a distributed feedback (DFB) laser, an optical modulator, an optical ring-resonator-based modulator, a photodetector, a ring-resonator-based photodetector, a photonic wavelength filter, a wavelength multiplexer, a wavelength demultiplexer, a tunable laser, and a laser comprising a ring-resonator-based mirror.

7. A photonic integrated circuit (PIC) including a wavelength-division multiplexed (WDM) system, wherein the PIC includes:
a substrate that includes N spatial positions SP-i, where i=1 through N, wherein the spatial positions are arranged such that the value of i increases linearly along a first dimension; and
a plurality of devices DEV-$\lambda i$, where i=1 through N, disposed on the substrate in spatial positions SP-1 through SP-N, wherein devices DEV-$\lambda 1$ through DEV-$\lambda N$ are wavelength selective for wavelength channels $\lambda 1$ through $\lambda N$, respectively, and wherein the plurality of devices is arranged in a first arrangement in which at least one device DEV-$\lambda i$ is located at a spatial position other than spatial position SP-i;
wherein a performance characteristic of each of devices DEV-$\lambda 1$ through DEV-$\lambda N$ is based on a parameter that is non-uniform along the first dimension, the parameter being selected from the group consisting of temperature, wavelength-dependent loss, signal integrity, and signal strength.

8. The PIC of claim 7 wherein each device of the plurality thereof is selected from the group consisting of a laser, a distributed feedback (DFB) laser, an optical modulator, an optical ring-resonator-based modulator, a photodetector, a ring-resonator-based photodetector, a photonic wavelength filter, a wavelength multiplexer, a wavelength demultiplexer, a tunable laser, and a laser comprising a ring-resonator-based mirror.

9. The PIC of claim 7 wherein a performance characteristic of the first device DEV-$\lambda i$ has a first value based on the parameter at the location of the first device in the first arrangement, and wherein the performance characteristic of the first device has a second value based on the parameter at spatial position SP-i, and wherein the first value and second value are different.

10. The PIC of claim 7 wherein each device of the plurality thereof comprises a laser for emitting an output signal having a design frequency that corresponds to the center wavelength of a different wavelength channel of the plurality thereof, and wherein each pair of adjacent design frequencies is separated by a frequency spacing, and wherein the non-uniform parameter causes a first error of a first frequency spacing of the plurality thereof, and further wherein the first arrangement reduces the first error.

11. The PIC of claim 7 wherein the parameter is temperature that is characterized by a parabolic profile along the first dimension from spatial positions SP-1 to SP-N, and wherein the first arrangement includes a plurality of device pairs, and wherein the devices of each device pair operate on spectrally adjacent wavelength channels and are located at spatial positions of the plurality thereof that are at substantially the same temperature.

12. A method for passively compensating for a parameter that is non-uniform along a first dimension of a photonic integrated circuit (PIC) that includes a wavelength-division multiplexed (WDM) system, the method including:
providing a substrate that includes N spatial positions SP-i, where i=1 through N, wherein the spatial positions are arranged such that the value of i increases linearly along the first dimension; and
providing a plurality of devices DEV-$\lambda i$, where i=1 through N, disposed on the substrate in spatial positions SP-1 through SP-N, wherein devices DEV-$\lambda i$ through DEV-$\lambda N$ are wavelength selective for wavelength channels $\lambda 1$ through $\lambda N$, respectively, and wherein a performance characteristic of each of devices DEV-$\lambda 1$ through DEV-$\lambda N$ is based on the parameter;
wherein the plurality of devices is arranged in a first arrangement in which at least one device DEV-$\lambda i$ is located at a spatial position other than spatial position SP-i; and
wherein the parameter being selected from the group consisting of temperature, wavelength-dependent loss, signal integrity, and signal strength.

13. The method of claim 12 further comprising selecting the first arrangement such that the performance characteristic of the first device DEV-$\lambda i$ is improved at its location in the first arrangement relative the performance characteristic for the first device when located at spatial position SP-i.

14. The method of claim 12 wherein each device of the plurality thereof is selected from the group consisting of a laser, a distributed feedback (DFB) laser, an optical modulator, an optical ring-resonator-based modulator, a photodetector, a ring-resonator-based photodetector, a photonic wavelength filter, a wavelength multiplexer, a wavelength demultiplexer, a tunable laser, and a laser comprising a ring-resonator-based mirror.

15. The method of claim 12 wherein each of the plurality of wavelength channels has a center wavelength, and wherein the center wavelengths of the plurality thereof increase linearly, and further wherein the plurality of devices is arranged in the first arrangement such that the operating wavelengths change non-linearly along the first dimension.

\* \* \* \* \*